United States Patent
Rajca et al.

(10) Patent No.: US 6,223,850 B1
(45) Date of Patent: May 1, 2001

(54) FOUR POINT POWERTRAIN MOUNTING AND TRANSMISSION INSPECTION COVER THEREFOR

(75) Inventors: Stanley H. Rajca, Northville; Bruce A. Hamlin, Rochester, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/541,569

(22) Filed: Apr. 3, 2000

(51) Int. Cl.$^7$ .................................................. B60K 17/00
(52) U.S. Cl. ........................ 180/377; 180/382; 180/312
(58) Field of Search .................................. 180/377, 382, 180/312

(56) References Cited

U.S. PATENT DOCUMENTS

| | | | |
|---|---|---|---|
| 1,406,316 | 2/1922 | Whitten | 180/377 |
| 1,435,480 * | 11/1922 | Kerr | 180/377 |
| 1,604,139 * | 10/1926 | Werner | 180/377 |
| 3,353,771 | 11/1967 | Bow | 248/3 |
| 3,942,599 | 3/1976 | Shimada | 180/64 |
| 4,387,605 * | 6/1983 | Grey et al. | 180/377 |
| 4,506,757 * | 3/1985 | Matsumoto et al. | 180/382 |
| 5,090,502 | 2/1992 | Inoue et al. | 180/321 |
| 5,291,966 | 3/1994 | Kato | 180/292 |
| 5,305,847 | 4/1994 | Mefford | 180/292 |
| 5,785,143 * | 7/1998 | Leber et al. | 180/382 |

* cited by examiner

*Primary Examiner*—Kenneth R. Rice
(74) *Attorney, Agent, or Firm*—Jeffrey A. Sedlar

(57) ABSTRACT

A vehicle powerplant including an engine-transmission assembly has the engine and transmission connected together at adjacent ends and includes four mounting points. The engine has opposite sides each including one of the mounting points. The transmission includes a housing also having opposite sides and having an inspection opening in the housing adjacent the engine. A cover is secured to the housing and closes the inspection opening. The cover has two opposite supporting portions extending beyond the opposite sides of the transmission and each supporting portion includes one of the mounting points. The four mounting points are connectable with brackets for mounting the powerplant in a vehicle. Optionally, the mounting points include mounting pads on supporting ears of the transmission cover.

10 Claims, 3 Drawing Sheets

FOUR POINT POWERTRAIN MOUNTING AND TRANSMISSION INSPECTION COVER THEREFOR

TECHNICAL FIELD

This invention relates to four point mounting of a vehicle powertrain, and more particularly, to an engine mounted transmission having spaced mounting pads located on an inspection cover modified to form a structural member with extending ears carrying the spaced pads for receiving engine mount brackets.

BACKGROUND OF THE INVENTION

It is known in the art relating to so-called heavy duty engine-transmission combinations to provide a four point powertrain mounting. For example, two mounting pads may be located on the sides or front end of the engine and connected through brackets to a vehicle frame. A transmission connected with the rear end of the engine may include two additional mounting pads located on the sides of the bell housing and connected through brackets to spaced locations on the vehicle frame. Such heavy duty transmissions generally have a full 360 degree bell housing enclosing a fluid coupling or other components connecting the torque transmitting portions of the engine and transmission.

In contrast, lighter weight automobile and truck transmissions connected with engines to form a powerplant are generally supported by a three point suspension, including two side or front mounted engine mounts and a single rear mount supporting the rear end of the transmission. Commonly, such transmissions have only a partial bell housing for connecting the transmission to the engine, leaving an opening in the lower portion of the bell housing which is generally covered in assembly by an inspection cover.

In a case where a moderate duty powertrain includes an engine connected with a transmission of the type having an inspection opening in the lower portion of the transmission bell housing, it was desired to provide a four point powertrain mounting to better support the powertrain and reduce bending loads on the unit when applied in a truck application. However, the cost of modifying the high volume transmission case to accept dual mounting pads for the four point mounted appeared excessive.

SUMMARY OF THE INVENTION

The present invention provides a solution to the problem by modifying the inspection cover to make it a structural member which closes the inspection opening as before and, in addition, includes outwardly extending ears on which engine mounting pads are provided. In assembly, the mounting pads are connected to brackets which extend upward for connecting the transmission to the vehicle frame in a desired manner. The cost of providing the modified cover is much lower than the cost of modifying the high volume transmission case and therefore provides a solution to the problem with a much lower cost factor.

These and other features and advantages of the invention will be more fully understood from the following description of certain specific embodiments of the invention taken together with the accompanying drawings.

DESCRIPTION OF THE PREFERRED EMBODIMENT

Figure 1:
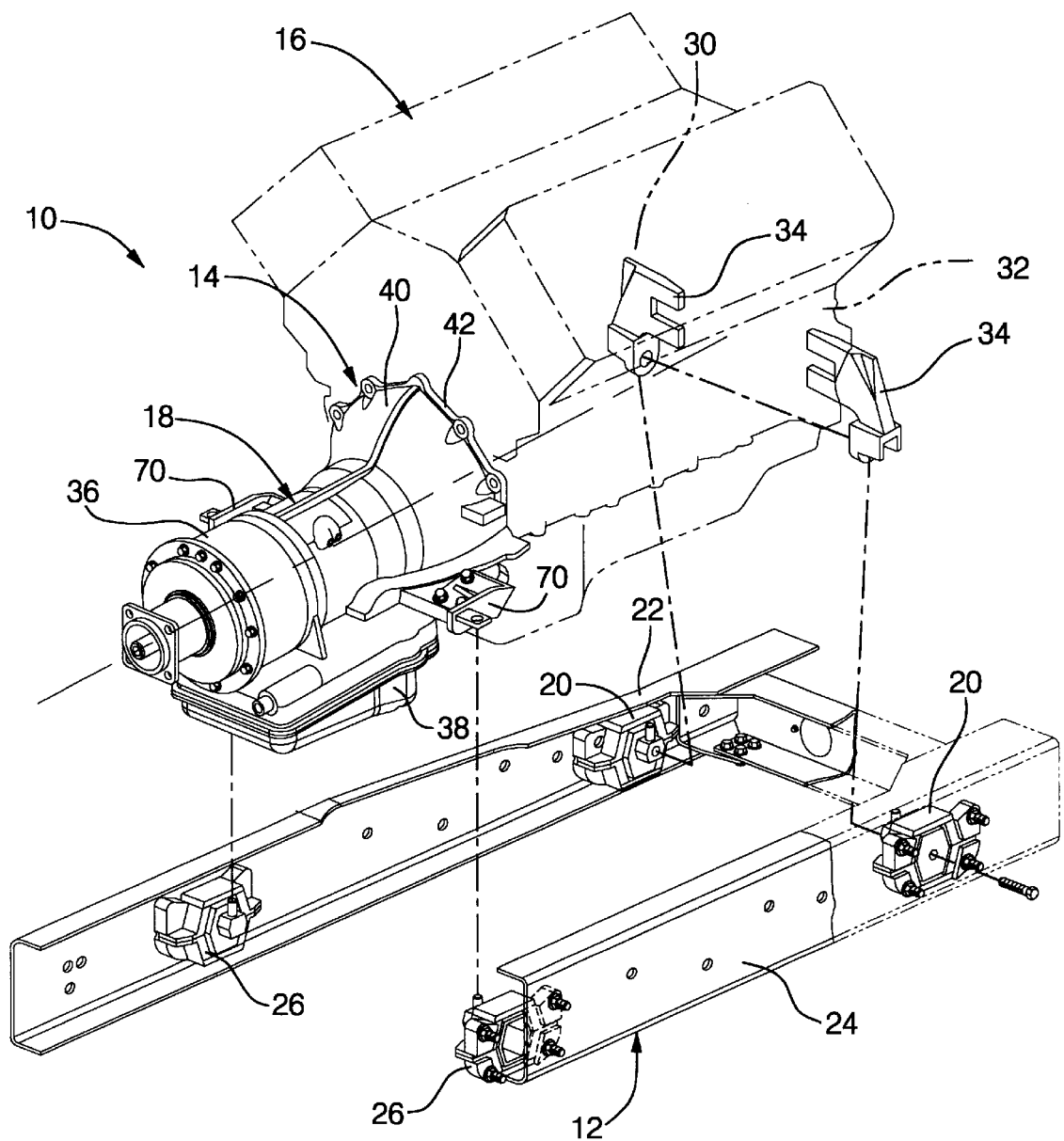
FIG. 1 is an exploded pictorial view partially in phantom illustrating the mounting of a vehicle powerplant in a vehicle frame with a four point mounting system according to the invention.

Referring first to FIG. 1 of the drawings, numeral 10 generally indicates a portion of an automotive vehicle, such as a truck, including a frame 12 on which is mounted a vehicle powerplant 14. The powerplant includes an engine 16 having a transmission 18 attached to the rear end of the engine to form an assembly. The powerplant 14 is mounted in the frame 12 by a four point mounting system formed according to the invention and providing a substantial and stable mounting arrangement for supporting and controlling motion of the powerplant within the frame.

The powerplant mounting includes a pair of front engine mounts 20 secured one each to left and right hand frame rails 22, 24 of the frame 12. A similar pair of rear engine mounts 26 are secured one each to the left and right frame rails at a location spaced rearward on the frame from the front engine mounts 20.

The engine includes a pair of front mounting pads, not shown, located on opposite sides 30, 32 at the front end of the engine. A pair of front mounting brackets 34 are secured to the front mounting pads and, in assembly, are mounted on and fixed to the front engine mounts 20 of the vehicle frame.

Figure 2:
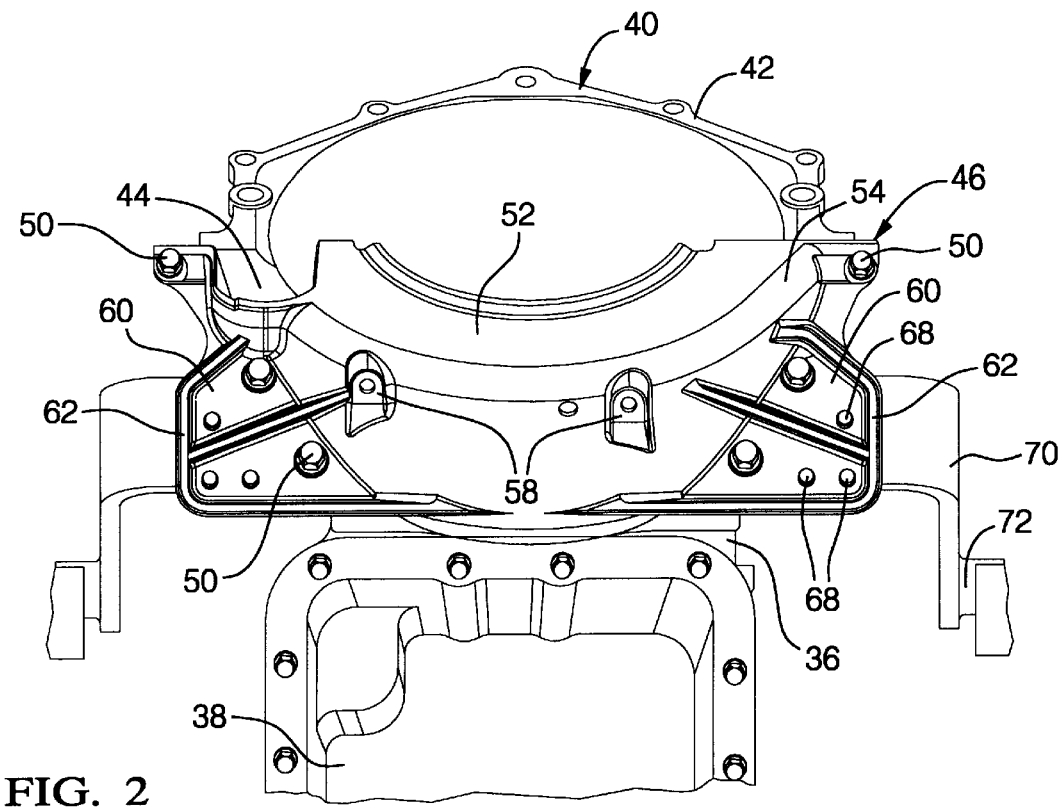
FIG. 2 is a bottom view of a transmission housing assembly including a lower transmission cover with mounting means according to the invention.
Figure 3:
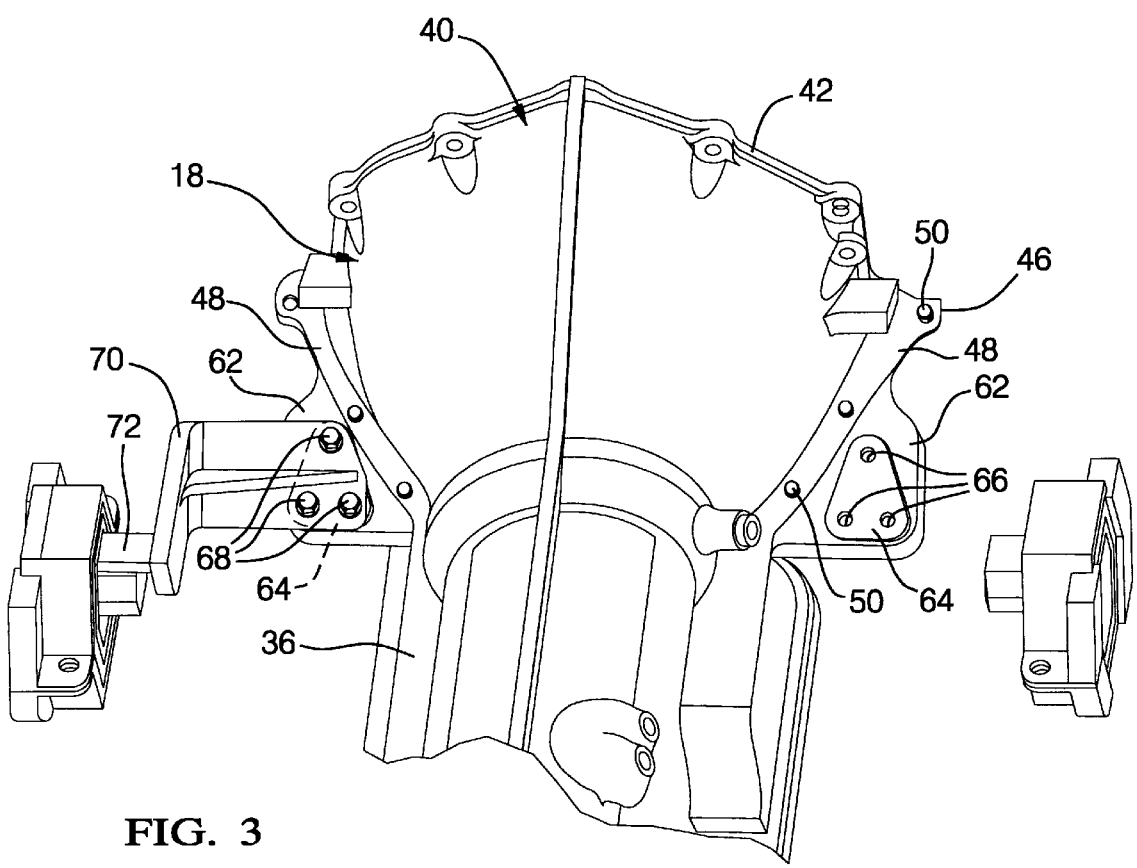
FIG. 3 is a pictorial top view of the transmission housing assembly of FIG. 2.
Figure 4:
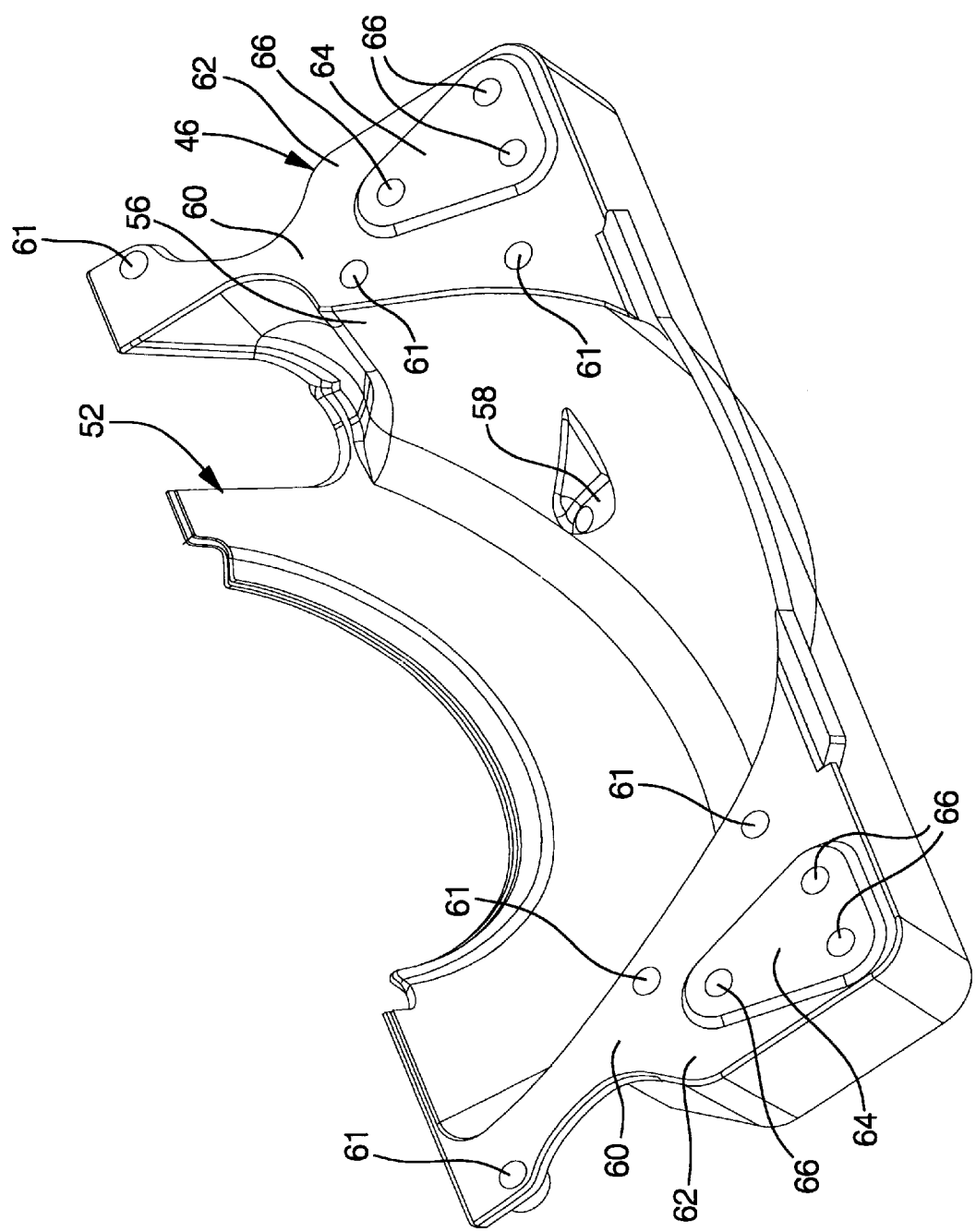
FIG. 4 is a pictorial top view of the lower transmission cover of the invention prior to assembly with the transmission housing.

As seen in FIGS. 1–3, the transmission 18 includes a housing 36 closed at the lower end by an oil pan 38. The housing 36 includes a partial bell housing 40 flaring outward in the area forward of the oil pan and terminating forward in a flange 42 by which the transmission is secured to the rear end of the engine 16. In this model of transmission, the bell housing attaches to an associated flywheel housing of the engine over less than a full 360 degree extent of the flywheel area. A lower portion of the bell housing defines an opening 44 through which the torque converter and input shaft or other torque transmitting elements of the transmission may be viewed for inspection purposes. This inspection opening 44 is normally closed by a lower transmission cover 46 which is fastened to lower flanges 48 of the bell housing 40 by suitable fasteners 50, such as screws or the like.

The transmission cover 46 is preferably made as a relatively heavy structural member. Cover 46 includes an enclosing wall 52 having an exterior lower surface 54 and an interior upper surface 56 defining a well for enclosing the associated transmission components. The wall may include mounting bosses 58 for attaching additional associated components to the lower side of the transmission. Wall 52 further includes a pair of cover mounting flanges 60 including fastener openings 61 through which fasteners 50 are applied to secure the cover 46 to the bell housing 40 of the transmission housing 36.

The cover mounting flanges 60 additionally include lateral outward extensions 62 forming ears, on the upper sides of which are formed a pair of laterally spaced mounting pads 64 each including three triangularly spaced openings 66. The openings 66 are preferably threaded to receive fasteners 68 which may secure a rear mounting bracket 70 to each of the mounting pads 64. The brackets 70 extend upward alongside the transmission and include laterally extending lugs which, in assembly, are seated on and secured to the rear engine mounts 26. Thus, the invention provides a four point mounting arrangement for the vehicle powerplant 10 in which two of the mounting points comprise mounting pads 28 at the front corners or sides of the engine and the other two of the mounting points comprise rear mounting pads 64 formed on the lower transmission cover at the forward end of the transmission housing.

The provision of a structural lower transmission cover in place of the usual light weight metal cover, intended only to protect the interior from engagement by foreign objects, provides the necessary strength for supporting the rear end of the vehicle powerplant from the pads mounted on laterally extending ears of the cover. Provision of the mounting pads on the relatively inexpensive lower transmission cover provides for the engine-transmission assembly the desired four point mounting in place of the more usual three point mounting utilized with powerplants having transmissions of the type described.

The transmission housing is already made in high volume for use with the traditional three point mounting arrangements previously provided for. Thus, this modification is accomplished at a much lower cost than would be the case if the mounting pads were mounted on the transmission housing itself, requiring modified transmission housing tooling to be made for applications in which the four point mounting is desired. The resulting four point mounting thus accomplishes the desired purpose of providing a more substantial and stable mounting arrangement for the engine transmission assembly in the vehicle frame. This is accomplished at a substantially lower cost for the modified lower transmission cover which provides the rear mounting support for the powerplant four point mounting system of the invention.

While the invention has been described by reference to a preferred embodiment, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A vehicle powerplant comprising:
   an engine-transmission assembly including an engine and a transmission connected together at adjacent ends and having four mounting points,
   said engine having opposite sides with each side including one of said mounting points;
   said transmission including a housing having opposite sides and connected at one end to the engine and an inspection opening in the housing adjacent said one end; and
   a cover secured to said housing and closing said inspection opening, the cover having two opposite supporting portions extending beyond the opposite sides of the transmission and each supporting portion including one of said mounting points;
   said four mounting points including attaching means for mounting the powerplant in a vehicle.

2. A vehicle powerplant as in claim 1 wherein said transmission cover supporting portions include mounting pads having fastener receiving openings for securing the transmission to an associated vehicle frame.

3. A vehicle powerplant as in claim 2 and including a mounting bracket secured to each of said mounting pads and adapted for connection with a vehicle frame for supporting the powerplant in the frame.

4. A transmission including a housing having a mounting portion for securing the transmission to an associated engine, the transmission including an inspection opening for viewing elements of the transmission after assembly with the engine and the mounting portion including a cover mounted on the housing and closing the inspection opening;
   said cover having a pair of spaced mounting pads including fastener receiving openings for use in securing the transmission to a vehicle frame.

5. A transmission as in claim 4 and including a mounting bracket secured to each of said mounting pads and adapted for connection with a vehicle frame for supporting the transmission in the frame.

6. A transmission as in claim 4 wherein said cover includes ears extending beyond said housing and the mounting pads are located on said ears.

7. A transmission as in claim 6 wherein said cover includes an upper surface facing the inspection opening and a lower surface facing away from the opening and said mounting pads are located on an extension of the upper surface.

8. A transmission cover for closing an inspection opening in a transmission housing and for mounting the transmission on a vehicle frame, said cover comprising:
   a load supporting member having an enclosing wall with an interior upper surface and an exterior lower surface and at least one flange for securing the cover to the transmission housing; and
   a pair of spaced mounting pads on an exterior portion of the cover and including fastener receiving openings in the pads for use in supporting the transmission in a vehicle frame.

9. A transmission cover as in claim 8 wherein said cover includes ears extending beyond said flange and the mounting pads are located on said ears.

10. A transmission cover as in claim 9 wherein said cover includes an upper interior surface and a lower exterior surface and said mounting pads are located on an exterior extension of the upper surface.

* * * * *